US012772210B2

(12) United States Patent
Zhao

(10) Patent No.: US 12,772,210 B2
(45) Date of Patent: Oct. 20, 2026

(54) DATA COMMUNICATION METHOD AND APPARATUS, AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 280 days.

(21) Appl. No.: 18/702,395

(22) PCT Filed: Sep. 21, 2022

(86) PCT No.: PCT/CN2022/120146
§ 371 (c)(1),
(2) Date: Apr. 18, 2024

(87) PCT Pub. No.: WO2023/065941
PCT Pub. Date: Apr. 27, 2023

(65) Prior Publication Data

US 2024/0414696 A1 Dec. 12, 2024

(30) Foreign Application Priority Data

Oct. 19, 2021 (CN) ........................ 202111216274.0

(51) Int. Cl.
*H04W 72/02* (2009.01)
*H04W 28/02* (2009.01)
(Continued)

(52) U.S. Cl.
CPC ....... *H04W 72/02* (2013.01); *H04W 28/0278* (2013.01); *H04W 40/22* (2013.01); *H04W 52/365* (2013.01)

(58) Field of Classification Search
None
See application file for complete search history.

(56) References Cited

U.S. PATENT DOCUMENTS

2021/0126746 A1 4/2021 Li et al.
2021/0168814 A1 6/2021 Chen et al.
(Continued)

FOREIGN PATENT DOCUMENTS

CN 110139369 A 8/2019
CN 110830952 A 2/2020
(Continued)

OTHER PUBLICATIONS

First Office Action issued Jul. 4, 2025 in Chinese Application No. 202111216274.0.
(Continued)

*Primary Examiner* — Anh Vu H Ly
(74) *Attorney, Agent, or Firm* — Harness, Dickey & Pierce, P.L.C.

(57) ABSTRACT

Data communication method and apparatus, and terminal are provided. The method includes: performing, by a first terminal, a media access control control element (MAC CE) transmission and/or reception only on the direct path if the first terminal is configured with both direct path and indirect path by a first communication device or the direct path and indirect path are both activated by the first communication device; where the first communication device is a network-side device accessed by the first terminal, or a peer terminal communicating with the first terminal.

17 Claims, 4 Drawing Sheets

(51) Int. Cl.
*H04W 40/22* (2009.01)
*H04W 52/36* (2009.01)

(56) References Cited

U.S. PATENT DOCUMENTS

| | | | | |
|---|---|---|---|---|
| 2021/0195647 | A1 | 6/2021 | Chang et al. | |
| 2021/0345176 | A1 | 11/2021 | Zhang et al. | |
| 2022/0286234 | A1 | 9/2022 | Zhao | |
| 2022/0377823 | A1* | 11/2022 | Elazzouni | H04W 76/15 |
| 2024/0205789 | A1* | 6/2024 | Wu | H04W 8/22 |
| 2024/0397570 | A1* | 11/2024 | Shapin | H04W 28/08 |
| 2024/0414624 | A1* | 12/2024 | Zhao | H04W 48/20 |

FOREIGN PATENT DOCUMENTS

| | | | |
|---|---|---|---|
| CN | 112055415 | A | 12/2020 |
| CN | 112385165 | A | 2/2021 |
| CN | 112399641 | A | 2/2021 |
| CN | 113411833 | A | 9/2021 |
| WO | 2017039735 | A1 | 3/2017 |
| WO | 2020/142929 | A1 | 7/2020 |
| WO | 2020/145863 | A1 | 7/2020 |
| WO | 2020/147835 | A1 | 7/2020 |
| WO | 2021/163041 | A1 | 8/2021 |

OTHER PUBLICATIONS

International Search Report and Written Opinion issued Oct. 25, 2022 in International Application No. PCT/CN2022/120146.

Extended European Search Report issued Jan. 28, 2025 in European Application No. 22882552.7.

Apple, "[Pre115-e][605][Reply] Summary of AI 8.7.2.4. QoS(Apple)", 3GPP TSG-RAN WG2 Meeting #114-e, R2-2109018, Aug. 15, 2021.

Second Office Action issued Jan. 28, 2026 in Chinese Application No. 2021112162740.

Vivo, "Further discussion on scope and scenarios of SL reply," 3GPP TSG-RAN WG2 Meeting #112e, R2-2009584, Nov. 2, 2020.

* cited by examiner

DATA COMMUNICATION METHOD AND APPARATUS, AND TERMINAL

CROSS-REFERENCE TO RELATED APPLICATIONS

The present application is the U.S. national phase of PCT Application No. PCT/CN2022/120146 filed on Sep. 21, 2022, which claims a priority to the Chinese patent application No. 202111216274.0 filed in China on Oct. 19, 2021, the disclosures of each of which are incorporated herein by reference in their entireties.

TECHNICAL FIELD

The present disclosure relates to the field of communications technology, and in particular, to a data communication method and apparatus, and a terminal.

BACKGROUND

In order to expand network coverage, one solution is to introduce a relay. The relay may be a terminal with relay function. After the introduction of relay, in order to improve the peak rate and transmission reliability of a remote terminal, the terminal may perform data communication by using a direct path and an indirect path simultaneously, or using multiple indirect paths simultaneously, that is, multi-path transmission. The cellular network is a system based on scheduling. A base station allocates time-frequency resources required for data communication to a terminal. The terminal receives downlink data or transmits uplink data according to the scheduling command of the base station. When the terminal transmits the uplink data, an uplink (UL) medium access control (MAC) control element (CE) may be used to transmit uplink-related information, such as scheduling request (SR) and buffer status reporting (BSR).

In cellular networks in the related art, UL MAC CE transmission may use any type of UL resources. However, if the relay is introduced, the MAC CE transmission manner in the related art may be no longer applicable to the indirect path.

SUMMARY

The disclosure is to provide a data communication method and apparatus, and a terminal, which can ensure that that the terminal can transmit a UL MAC CE to a target device even if the indirect path is introduced.

An embodiment of the present disclosure provides a data communication method, including:

performing, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal, or a peer terminal communicating with the first terminal.

Optionally, the MAC CE includes at least one of the following:

Buffer state report (BSR) MAC CE;
Power headroom reporting (PHR) MAC CE;
recommended bit rate MAC CE;
configured grant confirmation MAC CE;

duplication activation/deactivation MAC CE;
cell activation/deactivation MAC CE;
path activation/deactivation MAC CE;
end-to-end MAC CE between a second terminal and the first communication device.

Optionally, in a case that the MAC CE is the BSR MAC CE, the method further includes:

determining a mapping relationship between a logical channel group (LCG) identifier and a logical channel corresponding to an end-to-end bearer between the first terminal and the first communication device;

where the mapping relationship is a mapping relationship between the LCG identifier and the logical channel configured by the first communication device for an end-to-end bearer selected, by the first communication device from end-to-end bearers, that performs transmission via a direct path.

Optionally, in a case that the MAC CE is the BSR MAC CE, the method further includes:

determining uplink available data of a logical channel corresponding to an end-to-end bearer between the first terminal and the first communication device; where the logical channel is a logical channel that only uses a direct path for data communication;

the uplink available data includes: packet data convergence protocol (PDCP) data and radio link control (RLC) layer data related to the logical channel.

Optionally, in a case that the MAC CE is the PHR MAC CE, the method further includes:

determining a PHR trigger condition;

where the PHR trigger condition includes: the first communication device configures or activates a new communication path for the first terminal.

Optionally, in a case that the MAC CE is the PHR MAC CE, power for a direct path corresponding to a target cell is deducted in calculating PH information of the target cell in the PHR MAC CE.

Optionally, a power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

An embodiment of the present disclosure provides a terminal including: a memory, a transceiver, and a processor, where the memory is configured to store a computer program; the transceiver is configured to transmit and receive data under the control of the processor; the processor is configured to read the computer program in the memory and perform the following operations:

performing, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal or a peer terminal communicating with the first terminal.

Optionally, the MAC CE includes at least one of the following:

BSR MAC CE;

PHR MAC CE;

recommended bit rate MAC CE;

configured grant confirmation MAC CE;

duplication activation/deactivation MAC CE;

cell activation/deactivation MAC CE;

path activation/deactivation MAC CE;

end-to-end MAC CE between a second terminal and the first communication device.

Optionally, in a case that the MAC CE is the BSR MAC CE, the processor is configured to read the computer program in the memory and perform the following operations:

determining a mapping relationship between a logical channel group (LCG) identifier and a logical channel corresponding to an end-to-end bearer between the first terminal and the first communication device;

where the mapping relationship is a mapping relationship between the LCG identifier and the logical channel configured by the first communication device for an end-to-end bearer which is selected, by the first communication device from end-to-end bearers, that performs transmission via a direct path.

Optionally, in a case that the MAC CE is the BSR MAC CE, the processor is configured to read the computer program in the memory and perform the following operations:

determining uplink available data of a logical channel corresponding to an end-to-end bearer between the first terminal and the first communication device;

where the logical channel is a logical channel that only uses a direct path for data communication;

the uplink available data includes: PDCP data and RLC layer data related to the logical channel.

Optionally, in a case that the MAC CE is the PHR MAC CE, the processor is configured to read the computer program in the memory and perform the following operations:

determining a PHR trigger condition;

where the PHR trigger condition includes: the first communication device configures or activates a new communication path for the first terminal.

Optionally, in a case that the MAC CE is the PHR MAC CE, power for a direct path corresponding to a target cell is deducted in calculating PH information of the target cell in the PHR MAC CE.

Optionally, a power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

An embodiment of the present disclosure provides a data communication apparatus, including:

a first processing unit, configured to: perform, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal or a peer terminal communicating with the first terminal.

Optionally, the MAC CE includes at least one of the following:

buffer status reporting (BSR) MAC CE;

power headroom reporting (PHR) MAC CE;

recommended bit rate MAC CE;

configured grant confirmation MAC CE;

duplication activation/deactivation MAC CE;

cell activation/deactivation MAC CE;

path activation/deactivation MAC CE;

end-to-end MAC CE between a second terminal and the first communication device.

Optionally, in a case that the MAC CE is the BSR MAC CE, the apparatus further includes:

a first determining unit, configured to determine a mapping relationship between a logical channel corresponding to an end-to-end bearer between the first terminal and the first communication device and an LCG identifier;

where the mapping relationship is a mapping relationship between the LCG identifier and the logical channel configured by the first communication device for an end-to-end bearer selected, by the first communication device from end-to-end bearers, that performs transmission via a direct path.

Optionally, in a case that the MAC CE is the BSR MAC CE, the apparatus further includes:

a second determination unit, configured to determine uplink available data of a logical channel corresponding to an end-to-end bearer between the first terminal and the first communication device;

where the logical channel is a logical channel that only uses a direct path for data communication;

the uplink available data includes: PDCP data and RLC layer data related to the logical channel.

Optionally, in a case that the MAC CE is the PHR MAC CE, the apparatus further includes:

a third determination unit, configured to determine the PHR trigger condition; where the PHR trigger condition includes: the first communication device configures or activates a new communication path for the first terminal.

Optionally, in a case that the MAC CE is the PHR MAC CE, power for a direct path corresponding to a target cell is deducted in calculating PH information of the target cell in the PHR MAC CE.

Optionally, a power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmit power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

An embodiment of the present disclosure provides a processor-readable storage medium, on which a computer program is stored. When the computer program is executed by a processor, the steps of the above-mentioned data communication method are implemented.

Beneficial effects of the above technical solutions of the present disclosure are:

in embodiments of the present application, when there are both the direct path and the indirect path between the first terminal and the first communication device, if an end-to-end MAC CE needs to be communicated between the first terminal and the first communication device, a transmission restriction is introduced for the MAC CE, that is, the first terminal is only allowed to use the direct path to send and/or receive the MAC CE, thereby ensuring that the end-to-end MAC CE can be properly received by the target device.

DETAILED DESCRIPTION

In order to make the technical problems, technical solutions and advantages to be solved by the present disclosure clearer, a detailed description will be given below with reference to the accompanying drawings and specific embodiments. In the following description, specific details, such as specific configurations and components, are provided solely to assist in a comprehensive understanding of embodiments of the present disclosure. Accordingly, it will be apparent to those skilled in the art that various changes and modifications may be made to the embodiments described herein without departing from the scope and spirit of the disclosure. Additionally, descriptions of known functions and construction are omitted for clarity and conciseness.

It will be understood that reference throughout this specification to "the embodiment" or "an embodiment" means that a particular feature, structure, or characteristic associated with the embodiment is included in at least one embodiment of the present disclosure. Thus, the appearances of "in the embodiment" or "in an embodiment" in various places throughout this specification are not necessarily referring to the same embodiment. Furthermore, the particular features, structures or characteristics may be combined in any suitable manner in one or more embodiments.

In various embodiments of the present disclosure, it should be noted that the sequence numbers of the following processes do not mean the order of execution. The execution order of each process should be determined by its functions and internal logic, and the sequence numbers should not be construed as constituting any limitations on the implementations of the embodiments of the present disclosure.

In the embodiment of this disclosure, the term "and/or" describes the association relationship of associated objects, indicating that there may be three relationships, for example, A and/or B may mean three situations, namely A exists alone, A and B exist simultaneously, and B exists alone. The symbol "/" generally indicates that the related objects are in an "or" relationship.

In the embodiments of this application, the term "plurality" refers to two or more, and other quantifiers are similar to it.

The technical solutions in the embodiments of the present application will be clearly described below with reference to the accompanying drawings in the embodiments of the present application. Obviously, the described embodiments are only some of the embodiments of the present application, not all of the embodiments. Based on the embodiments in this application, all other embodiments obtained by those of ordinary skill in the art without creative efforts fall within the scope of this application.

When describing the embodiments of the present disclosure, some concepts used in the following description will first be explained.

(1) Cellular Network Communication.

Figure 1:
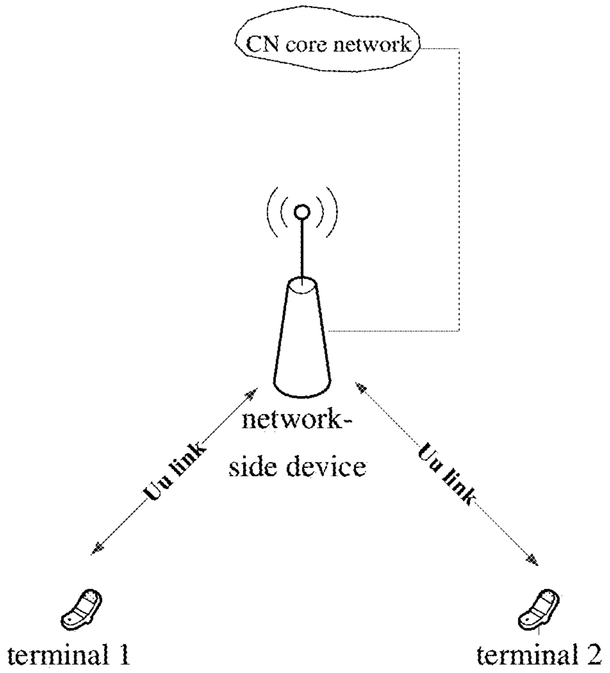
FIG. 1 shows a schematic structural diagram of cellular network communication.

In conventional radio communications, the cellular network communication may be used, that is, the terminal and the network-side device (such as base station) perform uplink and downlink data/control information communication through Uu interface, as shown in FIG. 1.

The cellular network is a system based on scheduling. The base station allocates to the terminal device the time-frequency resources required for data communication. The terminal receives downlink data or sends uplink data according to the scheduling command of the base station. Uplink data communication is scheduled by the base station. After the base station scheduler determines the uplink resource allocation, the base station scheduler will notify the terminal through an uplink grant (UL grant). The base station scheduler allocates uplink resources based on the amount of the uplink data to be sent by the terminal, that is, a buffer status of the terminal. The buffer status is at the terminal side. When the base station needs to know this information, the terminal needs to report BSR to the base station. BSR reporting is based on LCG. The LCG ID corresponding to the bearer/logical channel is configured when the bearer is established.

PHR of the cellular network is a mechanism for the UE to report the difference between the maximum power and the transmitting power of the UE to the base station. For the cellular network, the BSR/PHR and other reports are transmitted by using MAC CE.

(2) Direct Communication.

Figure 2:
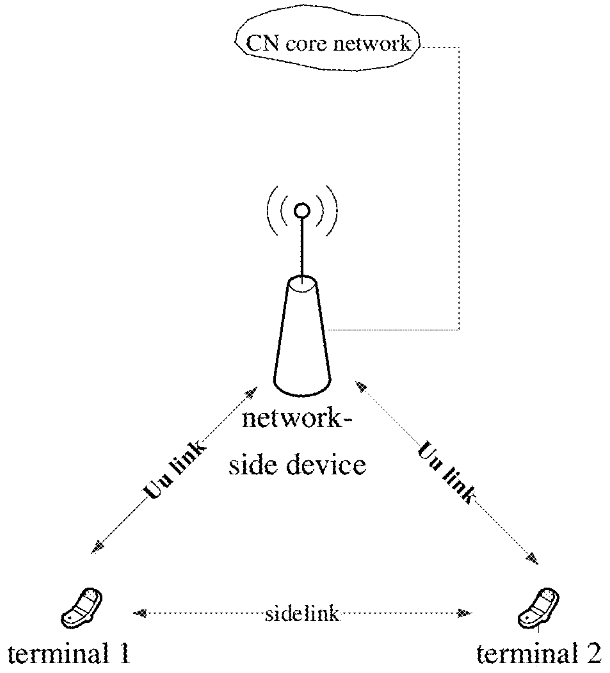
FIG. 2 shows a schematic diagram of a network structure of direct communication.

Direct communication refers to a way of data communication in which adjacent terminals may perform data communication over a short range through a direct communication link (also referred to as sidelink or PC5). The radio interface corresponding to the sidelink is referred to as the direct communication interface (also referred to as sidelink interface or PC5 interface), as shown in FIG. 2.

(3) Relay

Figure 3:
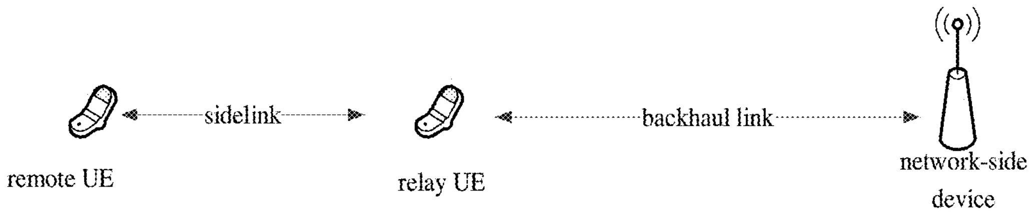
FIG. 3 shows a schematic diagram of U2N relay.

To extend network coverage, relays may be introduced. The relay may be a terminal with relay function. For U2N relay, an interface between the relay terminal and the network-side device may be the Uu interface, and an interface between the relay terminal and a relayed UE (which may be referred to as a remote UE) uses a direct communication interface (also referred to as sidelink interface or PC5 interface). The link between the relay terminal and the network-side device may be referred to as a backhaul link for the remote UE. U2N Relay is as shown in FIG. 3.

Depending on the protocol stack, the relay may be divided into L2 relay and L3 relay.

Bearers in the L2 relay scenario may be divided into three categories:

1) direct communication interface bearer: that is, the bearer between the remote UE and the relay UE;
2) end-to-end bearer between the remote UE and the network-side device: that is, the end-to-end bearer established between the remote UE and the network-side device;
3) backhaul link bearer of the remote UE via the Uu interface: that is, the bearer between the relay UE and the network-side device which is used for carrying the data of the remote UE.

In the above bearer categories, bearers and logical channels are in one-to-one correspondence, and logical channels have corresponding logical channel identifiers.

Figure 4:
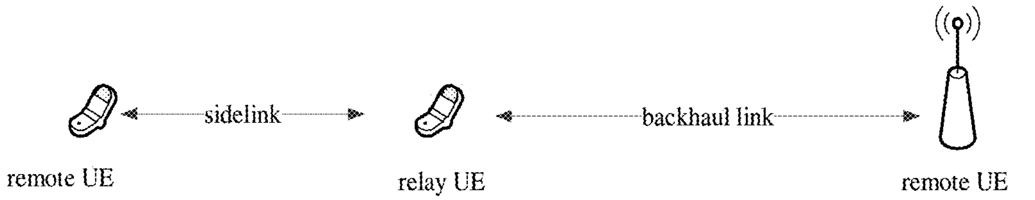
FIG. 4 shows a schematic diagram of U2U relay.

In order to expand U2U network coverage, U2U Relay may be introduced, as shown in FIG. 4.

After the relay is introduced, in order to distinguish the direct Uu interface communication path between the remote UE and the network-side device from the communication path between the remote UE and the network device through the relay UE, as well as in order to distinguish the direct PC5 interface communication path between the remote UE A and the remote UE B from the communication path via the relay UE, the following concepts are also included:

direct link (or direct path): transmitting and receiving nodes may communicate with each other directly without a relay terminal;

indirect link (or indirect path): transmitting and receiving nodes perform data communication through a relay terminal.

Specifically, an embodiment of the present disclosure provides a data communication method, such that the terminal is enabled to transmit UL MAC CE to the target device after the indirect path is introduced.

Figure 5:
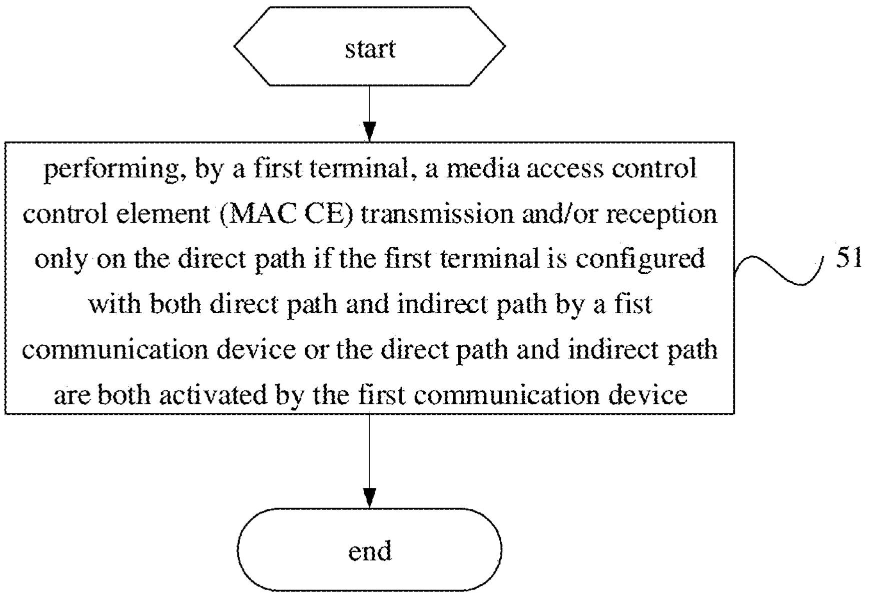
FIG. 5 shows a schematic flow diagram of a data communication method according to an embodiment of the present disclosure.

As shown in FIG. 5, an embodiment of the present disclosure provides a data communication method, which is applied to a first terminal and specifically includes the following step:

step 51: performing, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal, or is a peer terminal communicating with the first terminal, and the direct path refers to a communication path established directly between the first terminal and the first communication device, and the indirect path refers to a communication path established between the first terminal and the first communication device via a relay terminal.

In this embodiment, the peer terminal communicates with the first terminal. The first communication device may configure a communication path for the first terminal. In the case that the communication path includes the direct path and the indirect path, that is, there are both the direct path and the indirect path between the network-side device or the peer terminal and the first terminal, and an end-to-end (the end-to-end refers to: the first terminal and the network-side device, or the first terminal and the peer terminal) MAC CE is to be communicated between the first terminal and the network-side device or the peer terminal, a LCP restriction is introduced for the MAC CE, that is, only resources on the direct path are allowed to be used when the first terminal sends and/or receives the MAC CE.

In the embodiment of the present application, when there are both the direct path and the indirect path between the first terminal and the first communication device, and the end-to-end MAC CE needs to be communicated between the first terminal and the first communication device, a transmission restriction is introduced for the MAC CE, that is, the first terminal is allowed to use only the direct path to send and/or receive the MAC CE, thereby ensuring that the end-to-end MAC CE can be properly received by the target device.

Optionally, the MAC CE includes at least one of the following:

(1) buffer status reporting (BSR) MAC CE;
(2) power headroom reporting (PHR) MAC CE, which may include single entry PHR MAC CE or multiple entry PHR MAC CE;
(3) recommended bit rate MAC CE;
(4) configured grant confirmation MAC CE;
(5) duplication activation/deactivation MAC CE; the "duplication activation/deactivation MAC CE" is the type name of one MAC CE type;
(6) cell activation/deactivation MAC CE; the "cell activation/deactivation MAC CE" is the type name of one MAC CE type;
(7) path activation/deactivation MAC CE; the "path activation/deactivation MAC CE" is the type name of one MAC CE type;
(8) end-to-end MAC CE between a second terminal and the first communication device; the second terminal may be another terminal introduced subsequently.

As an optional embodiment, in a case that the MAC CE is the BSR MAC CE, the method further includes:

determining a mapping relationship between a logical channel group (LCG) identifier and a logical channel corresponding to an end-to-end bearer between the first terminal and the first communication device;

where the mapping relationship is a mapping relationship between the LCG identifier and the following logical channel: the first communication device selects an end-to-end bearer from end-to-end bearers, that performs transmission via a direct path; and the first communication device configures, for the selected end-to-end bearer the logical channel.

In this embodiment, the mapping relationship between the logical channel and the logical channel group (LCG) identifier is configured by the first communication device. For the end-to-end bearer between the first terminal and the first communication device, when the first communication device configures a correspondence relationship between the logical channel corresponding to the end-to-end bearer and the LCG ID, the first communication device may select, from end-to-end bearers between the first terminal and the first communication device, the end-to-end bearer which uses the direct path for transmission, and configure, only for the end-to-end bearer which uses the direct path for transmission, a mapping relationship between a corresponding logical channel and the LCG identifier.

As an optional embodiment, in a case that the MAC CE is the BSR MAC CE, the method further includes:

determining uplink available data of the logical channel corresponding to the end-to-end bearer between the first terminal and the first communication device;

where the logical channel is a logical channel that only uses a direct path for data communication; the uplink available data includes: packet data convergence protocol (PDCP) data and radio link control (RLC) layer data related to the logical channel.

In this embodiment, the MAC entity of the first terminal may determine the uplink available data (UL data available) of the logical channel. When determining the uplink available data, the MAC entity may only take the volume of PDCP and RLC layer data related to the logical channel that allows data communication by using the direct path into statistics.

The following describes an implementation process of the data communication method when the MAC CE is the BSR MAC CE through specific embodiments.

Figure 6:
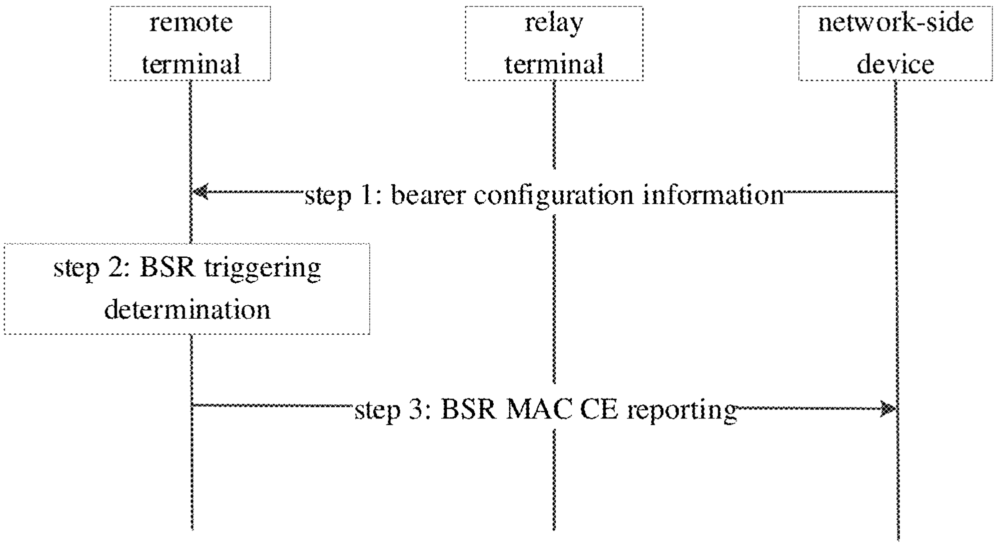
FIG. 6 shows another schematic flow diagram of a data communication method according to an embodiment of the present disclosure.

As shown in FIG. 6, the first terminal is a remote terminal, and the first communication device is a network-side device; the method specifically includes steps 1, 2 and 3.

Step 1: the network-side device sends bearer configuration information to the remote terminal.

For a bearer that uses the direct path for communication, the network-side device needs to configure, for the remote terminal, the mapping relationship between the end-to-end bearer and the Uu interface logical channel;

for a bearer that uses the indirect path for communication, the network-side device needs to configure, for the remote terminal, the mapping relationship between the end-to-end bearer, the Uu interface bearer and the sidelink interface bearer.

Since for the remote terminal, only the mode 2 resource allocation manner may be used on the sidelink interface, when the network-side device configures the bearer, it is noted that the network-side device configure, only for end-to-end bearer(s) of the remote terminal that is allowed to use the direct path for data communication, the mapping relationship between corresponding logical channel(s) and LCG ID(s), when configuring the mapping relationship between LCG IDs and corresponding logical channels for end-to-end bearers of the remote terminal.

Step 2: The remote terminal performs a BSR triggering determination on the direct path based on the bearer configuration information.

With respect to the trigger condition for triggering BSR reporting, a conventional mechanism can still be used. It should be noted that, behaviors of the MAC entity of the remote terminal with respect to the statistics on buffer status information carried in the BSR MAC CE are as follows: when determining the uplink available data of the logical channel corresponding to the end-to-end bearer between the remote terminal and the network-side device, the MAC entity of the remote terminal only takes the volume of PDCP and RLC layer data related to the logical channel that allows data communication by using the direct path into the statistics.

Step 3: The remote terminal reports to the network-side device the BSR MAC CE corresponding to the direct path.

When the remote terminal performs an LCP (logic channel prioritization) operation, the remote terminal may only perform BSR MAC CE communication through uplink resource on the direct path.

In this embodiment, in the case that the MAC CE is the BSR MAC CE, when the remote terminal reports the BSR MAC CE to the network-side device, the remote terminal is only allowed to use the direct path to send the BSR MAC CE, thereby ensuring that the BSR MAC CE can be received properly by the network-side device.

As an optional embodiment, in a case that the MAC CE is the PHR MAC CE, the method further includes:

determining a PHR trigger condition; the PHR trigger condition includes: the first communication device configures or activates a new communication path for the first terminal.

In this embodiment, in the case that the MAC CE is the PHR MAC CE, the following may be added to a PHR trigger condition; the first communication device configures a new path for the first terminal, or the first communication device activates a new path for the first terminal. That is, when the first communication device configures or activates a new path for the first terminal, the PHR is triggered. The new path may be a direct path or an indirect path.

As an optional embodiment, in the case that the MAC CE is the PHR MAC CE, when calculating PH information of a target cell in the PHR MAC CE, power for a direct path corresponding to the target cell is deducted.

In this embodiment, in a case that the MAC CE is the PHR MAC CE, considering that a cell may have both a direct path and an indirect path, when calculating the PH information of the cell, it is necessary to consider the power for the direct communication interface on the direct path, that is, when calculating the PH information of the target cell, the power for the direct path corresponding to the target cell needs to be deducted.

Specifically, power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

The implementation process of the data communication method when the MAC CE is the PHR MAC CE is described hereinafter with reference to specific embodiments.

Figure 7:
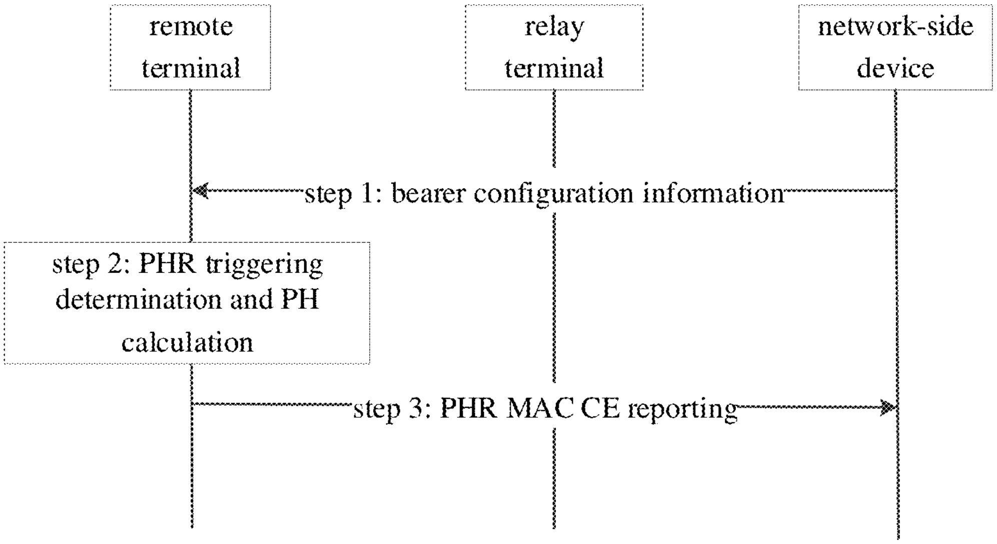
FIG. 7 shows still another schematic flow diagram of a data communication method according to an embodiment of the present disclosure.

As shown in FIG. 7, the first terminal is a remote terminal, and the first communication device is a network-side device, and the method includes the following steps 1, 2 and 3.

Step 1: the network-side device sends bearer configuration information to the remote terminal.

For a bearer that use the direct path for communication, the network-side device needs to configure the mapping relationship between the end-to-end bearer and the Uu interface logical channel for the remote terminal;

for a bearer that use the indirect path for communication, the network-side device needs to configure the mapping relationship between the end-to-end bearer, the Uu interface bearer and the direct communication interface bearer for the remote terminal.

Step 2: the remote terminal performs PHR triggering determination and PH calculation.

Specifically, the PHR triggering determination may adopt a conventional mechanism. It should be noted that a path loss used in determining whether PHR is triggered is a path loss on the direct path.

A newly added PHR trigger condition is used in the PHR triggering determination: when the network-side device configures or activates a new path for the remote terminal, PHR is triggered. The new path may be a direct path or an indirect path.

In the case that the MAC CE is the PHR MAC CE, when calculating the PH, since there may be both the direct path and the indirect path on one cell, power occupied by the direct communication interface on the direct path needs to be considered when calculating the PH information of the cell. Taking the calculation of the type 1 PH on the direct path as an example, the specific calculation may include, but is not limited to, the following calculation manner:

$$\text{Type 1 PH}=P_{cmax,c}-P_{sidelink}-P_{pusch,c}$$

where PH denotes where the power headroom of the remote terminal on the target cell; $P_{cmax,c}$ denotes the maximum transmitting power of the remote terminal that is allowed to be configurable on the target cell; $P_{sidelink}$ denotes the transmitting power of the remote terminal on the direct path of the target cell; $P_{pusch,c}$ denotes a power of transmitting PUSCH by the remote terminal on the indirect path of the target cell.

Step 3: The remote terminal reports to the network-side device the PHR MAC CE corresponding to the direct path.

When the remote terminal performs an LCP operation, the remote terminal may only perform PHR MAC CE transmission by using uplink resource on the direct path.

In this embodiment, in the case that the MAC CE is the PHR MAC CE, when the remote terminal reports the PHR MAC CE to the network-side device, the remote terminal is only allowed to use the direct path to send the PHR MAC CE, thereby ensuring that the PHR MAC CE may be received properly by the network-side device.

It should be noted that when the MAC CE is the BSR MAC CE or the MAC CE is the PHR MAC CE as shown in FIG. 6 and FIG. 7, the method of communicating the MAC CE is also applicable to communicating other UL/DL MAC CEs, and the processing and transmission manners thereof is similar to the above-mentioned embodiments of the present application, which will not be described again here.

In the embodiment of the present application, when there are both the direct path and the indirect path between the first terminal and the first communication device, and there is an end-to-end MAC CE that needs to be communicated between the first terminal and the first communication device, a transmission restriction is introduced for the MAC CE, that is, the first terminal is only allowed to use the direct path to send and/or receive the MAC CE, thereby ensuring that the end-to-end MAC CE can be properly received by the target device.

The above embodiments describe the data communication method of the present disclosure. The following embodiments will further describe the corresponding apparatus with reference to the accompanying drawings.

Figure 8:
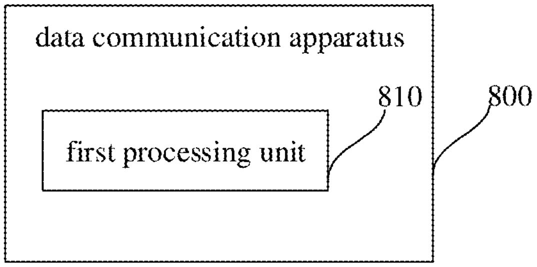
FIG. 8 shows a schematic structural diagram of a data communication apparatus according to an embodiment of the present disclosure.

Specifically, as shown in FIG. 8, an embodiment of the present disclosure provides a data communication apparatus 800, which is applied to a first terminal and includes:

a first processing unit 810, configured to: perform, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal or a peer terminal communicating with the first terminal, and the direct path refers to a communication path which a direct connection is between the first terminal and the first communication device, and the indirect path refers to a communication which the first terminal and the first communication device communication via a relay terminal.

Optionally, the MAC CE includes at least one of the following:

buffer status reporting (BSR) MAC CE;
power headroom reporting (PHR) MAC CE;
recommended bit rate MAC CE;
configured grant confirmation MAC CE;
duplication activation/deactivation MAC CE;
cell activation/deactivation MAC CE;
path activation/deactivation MAC CE;
end-to-end MAC CE between a second terminal and the first communication device.

Optionally, in a case that the MAC CE is the BSR MAC CE, the apparatus further includes:

a first determining unit, configured to determine a mapping relationship between an LCG identifier and a logical channel corresponding to an end-to-end bearer between the first terminal and the first communication device;

where the mapping relationship is a mapping relationship between the LCG identifier and the logical channel configured by the first communication device for an end-to-end bearer which is selected, by the first communication device from end-to-end bearers, that uses a direct path for communications.

Optionally, in a case that the MAC CE is the BSR MAC CE, the apparatus further includes:

a second determination unit, configured to determine uplink available data of a logical channel corresponding to an end-to-end bearer between the first terminal and the first communication device;

where the logical channel is a logical channel that only uses a direct path for data communication;

the uplink available data includes: PDCP data and RLC layer data related to the logical channel.

Optionally, in a case that the MAC CE is the PHR MAC CE, the apparatus further includes:

a third determination unit, configured to determine the PHR trigger condition;

where the PHR trigger condition includes: the first communication device configures or activates a new communication path for the first terminal.

Optionally, in a case that the MAC CE is the PHR MAC CE, power for a direct path corresponding to a target cell is deducted in calculating PH information of the target cell in the PHR MAC CE.

Optionally, power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

In the embodiment of the present application, when there are both the direct path and the indirect path between the first terminal and the first communication device, and there is an end-to-end MAC CE that needs to be communicated between the first terminal and the first communication device, a transmission restriction is introduced for the MAC CE, that is, the first terminal is only allowed to use the direct path to send and/or receive the MAC CE, thereby ensuring that the end-to-end MAC CE can be properly received by the target device.

It should be noted here that the above-mentioned apparatus provided by the embodiment of the present disclosure may implement all the method steps implemented by the above-mentioned method embodiment, and may achieve the same technical effect. The parts and beneficial effects of this embodiment that are same as those of the method embodiment will not be described in detail.

It should be noted that the division of units in the embodiment of the present application is schematic and is only a logical function division. In actual implementation, there may be other division methods. In addition, various functional units in various embodiments of the present application may be integrated into one processing unit, or each unit may exist physically alone, or two or more units may be integrated into one unit. The above integrated units may be implemented in the form of hardware or software functional units.

If the integrated unit is implemented in the form of a software functional unit and sold or used as an independent product, it may be stored in a processor-readable storage medium. Based on this understanding, essential parts, or parts contributing to the related art, of the technical solution of the present disclosure may be implemented in a form of a software product. The computer software product is stored in a storage medium, and includes several instructions to cause a computer device (which may be a personal computer, a server, or a network device, etc.) or a processor to execute all or part of the steps of the methods described in various embodiments of this application. The aforementioned storage media include: U disk, mobile hard disk, read-only memory (ROM), random access memory (RAM), magnetic disk or optical disc and other media that may store program code.

Figure 9:
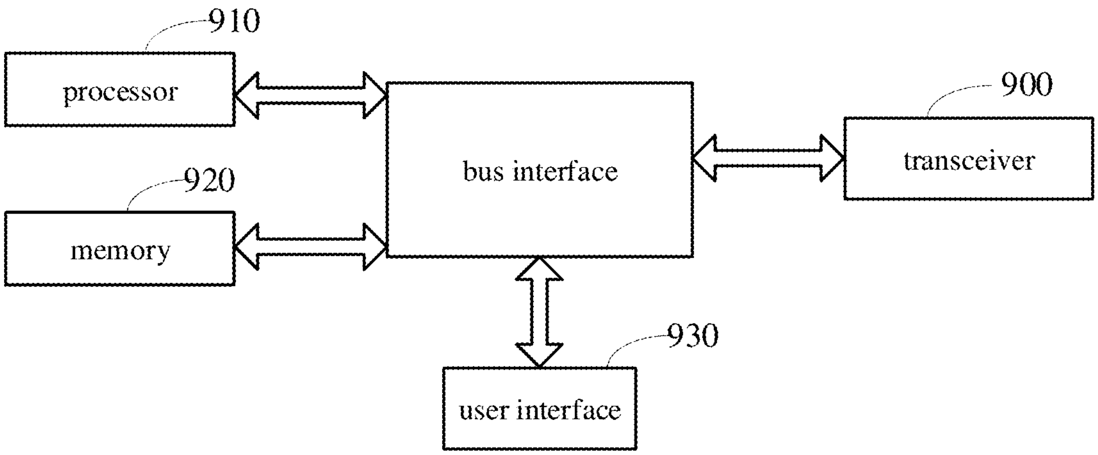
FIG. 9 shows a schematic structural diagram of a terminal according to an embodiment of the present disclosure.

As shown in FIG. 9, an embodiment of the present disclosure also provides a terminal, which is the first terminal and includes: a memory 920, a transceiver 900, and a processor 910.

The memory 920 is configured to store a computer program; the transceiver 900 is configured to send and receive data under the control of the processor; the processor 910 is configured to read the computer program in the memory and perform the following operations:

performing, by a first terminal, a media access control control element (MAC CE) transmission and/or reception only on the direct path if the first terminal is configured with both direct path and indirect path by a first communication device or the direct path and indirect path are both activated by the first communication device;

where the first communication device is a network-side device accessed by the first terminal or a peer terminal communicating with the first terminal, and the direct path refers to a direct communication path between the first terminal and the first communication device, and the indirect path refers to a communication path which the first terminal and the first communication device are connected via a relay terminal.

In the embodiment of the present application, when there are both the direct path and the indirect path between the first terminal and the first communication device, and there is an end-to-end MAC CE that needs to be communicated between the first terminal and the first communication device, a transmission restriction is introduced for the MAC CE, that is, the first terminal is only allowed to use the direct path to send and/or receive the MAC CE, thereby ensuring that the end-to-end MAC CE can be properly received by the target device.

Optionally, the MAC CE includes at least one of the following:

BSR MAC CE;

PHR MAC CE;

recommended bit rate MAC CE;

configured grant confirmation MAC CE;

duplication activation/deactivation MAC CE;

cell activation/deactivation MAC CE;

path activation/deactivation MAC CE;

end-to-end MAC CE between a second terminal and the first communication device.

Optionally, in a case that the MAC CE is the BSR MAC CE, the processor is configured to read the computer program in the memory and perform the following operations:

determining a mapping relationship between the LCG identifier and the logical channel corresponding to the end-to-end bearer between the first terminal and the first communication device;

where the mapping relationship is a mapping relationship between the LCG identifier and the logical channel configured by the first communication device for an end-to-end bearer, which is selected by the first communication device from end-to-end bearers, that uses a direct path for communication.

Optionally, in a case that the MAC CE is the BSR MAC CE, the processor is configured to read the computer program in the memory and perform the following operations:

determining uplink available data of a logical channel corresponding to an end-to-end bearer between the first terminal and the first communication device; where the logical channel is a logical channel that only uses a direct path for data communication;

the uplink available data includes: PDCP data and RLC layer data related to the logical channel.

Optionally, in a case that the MAC CE is the PHR MAC CE, the processor is configured to read the computer program in the memory and perform the following operations:

determining a PHR trigger condition;

where the PHR trigger condition includes: the first communication device configures or activates a new communication path for the first terminal.

Optionally, in a case that the MAC CE is the PHR MAC CE, power for a direct path corresponding to a target cell is deducted in calculating PH information of the target cell in the PHR MAC CE.

Optionally, power headroom of the first terminal on the target cell is:

$$PH=P_{cmax,c}-P_{sidelink}-P_{pusch,c}$$

where PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on a direct path of the target cell; $P_{pusch,c}$ denotes a power of the first terminal for transmitting a physical uplink shared channel (PUSCH) on an indirect path of the target cell.

In the embodiment of the present application, when there are both the direct path and the indirect path between the first terminal and the first communication device, and there is an end-to-end MAC CE that needs to be communicated between the first terminal and the first communication device, a transmission restriction is introduced for the MAC CE, that is, the first terminal is only allowed to use the direct path to send and/or receive the MAC CE, thereby ensuring that the end-to-end MAC CE can be properly received by the target device.

It should be noted that in FIG. 9, a bus architecture may include any number of interconnected buses and bridges, and connects various circuits including one or more processors represented by the processor 910 and memory represented by the memory 920. The bus architecture may also connect various other circuits such as peripherals, voltage regulators and power management circuits, which is well known in the art. Therefore, a detailed description thereof is omitted herein. A bus interface provides an interface. The transceiver 900 may be plural elements, i.e., including a transmitter and a receiver, to allow for communication with various other apparatuses on the transmission medium. For different terminals, the user interface 930 may be an interface capable of externally or internally connecting a required device, and the connected device includes, but is not limited to: a keypad, a display, a speaker, a microphone, a joystick and the like. The processor 910 is responsible for supervising the bus architecture and normal operation and the memory 920 stores the data being used by the processor 910 during operation.

Optionally, the processor 910 may be a central processing unit (CPU), application specific integrated circuit (ASIC), field-programmable gate array (FPGA) or complex programmable logic device (CPLD). The processor may also adopt a multi-core architecture.

The processor is configured to execute the method provided by the embodiments of the present application according to the obtained executable instructions by calling the computer program stored in the memory. The processor and memory may also be physically separated.

It should be noted here that the above-mentioned apparatus provided by the embodiments of the present disclosure may implement all the method steps implemented by the above-mentioned method embodiments, and may achieve the same technical effects. The parts and beneficial effects of this embodiment that are same as those of the method embodiment will not be described in detail.

In addition, specific embodiments of the present disclosure also provide a processor-readable storage medium on which a computer program is stored, where the steps of the above data communication method are implemented when the program is executed by the processor, and the same technical effects may be achieved. To avoid repetition, they will not be described again here. where the readable storage medium may be any available medium or data storage device that the processor may access, including but not limited to: magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, erasable programmable ROM (EPROM), electrically EPROM (EEPROM), non-volatile memory (NAND FLASH), solid state drive (SSD)).

Those skilled in the art will understand that embodiments of the present application may be provided as methods, systems, or computer program products. Accordingly, the present application may take the form of an entirely hardware embodiment, an entirely software embodiment, or an embodiment that combines software and hardware aspects. Furthermore, the application may take the form of a computer program product implemented on one or more computer-usable storage media (including, but not limited to, magnetic disk storage and optical storage, etc.) embodying computer-usable program codes therein.

The embodiments of the present disclosure have been described with reference to flow diagrams and/or block diagrams of methods, terminal devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by process executable instructions. These process executable instructions may be provided to a processor of a general purpose computer, special purpose computer, embedded processor, or other programmable data processing apparatus to produce a machine, such that the instructions, which are executed via the processor of the computer or other programmable data processing terminal device, create means for implementing the functions specified in the flow diagram flow or flows and/or block diagram block or blocks.

These process executable instructions may also be stored in a processor-readable storage that may direct a computer or other programmable data processing terminal device to function in a particular manner, such that the instructions stored in the processor-readable storage produce an article of manufacture including instruction means which implement the function specified in the flow diagram flow or flows and/or block diagram block or blocks.

The process executable instructions may also be loaded onto a computer or other programmable data processing terminal device to cause a series of operational steps to be performed on the computer or other programmable terminal device to produce a computer-implemented process such that the instructions which are executed on the computer or other programmable terminal device provide steps for implementing the functions specified in the flow diagram flow or flows and/or block diagram block or blocks.

It should be noted that it should be noted that the division of each module above is only a division of logical functions. In actual implementation, it may be fully or partially integrated into a physical entity, or it may also be physically separated. These modules may all be implemented in the form of software called by a processing component; they may also all be implemented in the form of hardware: some modules may also be implemented in the form of software called by a processing component, and some modules may be implemented in the form of hardware. For example, the determination module may be a separate processing element, or may be integrated into a chip of the above device. In addition, it may also be stored in the memory of the above device in the form of program code, and may be called by a certain processing element of the above device to execute the functions of the above identified modules. The implementation of other modules is similar. In addition, all or part of these modules may be integrated together or implemented independently. The processing element described here may be an integrated circuit with signal processing capabilities. During the implementation process, each step of the above method or each of the above modules may be completed by integrated logic circuits in the form of hardware or instructions in the form of software in the processor element.

For example, each module, unit, sub-unit or sub-module may be one or more integrated circuits configured to implement the above method, e.g., one or more application specific integrated circuits (ASICs), or one or Multiple microprocessors (digital signal processor, DSP), or one or more field programmable gate arrays (FPGAs), etc. For another example, when one of the above modules is implemented by a processing element scheduling program codes, the processing element may be a general-purpose processor, such as a central processing unit (CPU) or other processors that may call the program code. For another example, these modules may be integrated together and implemented in the form of a system-on-a-chip (SOC).

The terms "first", "second", etc. in the description and claims of the present disclosure are used to distinguish similar objects and are not necessarily used to describe a specific order or sequence. It is to be understood that the data so used are interchangeable under appropriate circumstances so that the embodiments of the disclosure described herein may be implemented, for example, in sequences other than those illustrated or described herein. In addition, the terms "include" and "comprise" and any variations thereof are intended to cover non-exclusive inclusions. For example, a process, method, system, product or equipment including a series of steps or units is not limited to those steps or units which are clearly listed, but may include other steps or units which are not clearly listed or intrinsic to the process, the method, the product or the equipment. In addition, the use of "and/or" in the description and claims represents at least one of the connected objects, e.g., A and/or B and/or C indicates the inclusion of 7 situations, namely, A alone, B alone, C alone, both A and B, both B and C, both A and C, and A, B and C all exist. Similarly, the use of "at least one of A and B" in this specification and in the claims should be understood to mean "A alone, B alone, or both A and B present."

Obviously, those skilled in the art may make various changes and modifications to the present application without departing from the spirit and scope of the present application. In this way, if these modifications and variations of the present application fall within the scope of the claims of this application and its equivalent technology, then this application is also intended to include these modifications and variations.

What is claimed is:

1. A data communication method, comprising:

performing, by a first terminal, a media access control control element (MAC CE) transmission and/or reception only on a direct path if the first terminal is configured with both the direct path and an indirect path by a first communication device or the direct path and the indirect path are both activated by the first communication device;

wherein the first communication device is a network-side device accessed by the first terminal, or a peer terminal communicating with the first terminal;

wherein the MAC CE comprises power headroom reporting (PHR) MAC CE, and the method further comprises:

determining a PHR trigger condition;

wherein the PHR trigger condition comprises: the first communication device configures or activates a new communication path for the first terminal.

2. The data communication method according to claim 1, wherein the MAC CE further comprises at least one of the following:

buffer status reporting (BSR) MAC CE;

recommended bit rate MAC CE;

configured grant confirmation MAC CE;

duplication activation/deactivation MAC CE;

cell activation/deactivation MAC CE;

path activation/deactivation MAC CE; or end-to-end MAC CE between a second terminal and the first communication device.

3. The data communication method according to claim 2, wherein in a case that the MAC CE further comprises the BSR MAC CE, the method further comprises:

determining a mapping relationship between a logical channel group (LCG) identifier and a logical channel corresponding to an end-to-end bearer between the first terminal and the first communication device;

wherein the mapping relationship is a mapping relationship between the LCG identifier and the logical channel configured by the first communication device for an end-to-end bearer selected, by the first communication device from end-to-end bearers, that performs transmission via the direct path.

4. The data communication method according to claim 2, wherein in a case that the MAC CE further comprises the BSR MAC CE, the method further comprises:

determining uplink available data of a logical channel corresponding to an end-to-end bearer between the first terminal and the first communication device;

wherein the logical channel is a logical channel that only uses the direct path for data communication;

the uplink available data comprises: packet data convergence protocol (PDCP) data and radio link control (RLC) layer data related to the logical channel.

5. The data communication method according to claim 1, wherein power for a direct path corresponding to a target cell is deducted in calculating power headroom (PH) information of the target cell in the PHR MAC CE.

6. The data communication method according to claim 5, wherein a power headroom of the first terminal on the target cell is:

$$PH=P_{cmax,c}-P_{sidelink}-P_{pusch,c}$$

wherein PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on the direct path of the target cell; $P_{pusch,c}$ denotes a power of the first terminal for transmitting a physical uplink shared channel (PUSCH) on an indirect path of the target cell.

7. A terminal, comprising:

a memory, a transceiver, and a processor, wherein the memory is configured to store a computer program; the transceiver is configured to transmit and receive data under the control of the processor; the processor is configured to read the computer program in the memory and perform the following operations:

performing, by a first terminal, a media access control control element (MAC CE) transmission and/or reception only on a direct path if the first terminal is configured with both the direct path and an indirect path by a first communication device or the direct path and the indirect path are both activated by the first communication device;

wherein the first communication device is a network-side device accessed by the first terminal, or a peer terminal communicating with the first terminal;

wherein the MAC CE comprises power headroom reporting (PHR) MAC CE, and the processor is further configured to read the computer program in the memory and perform the following operation:

determining a PHR trigger condition;

wherein the PHR trigger condition comprises: the first communication device configures or activates a new communication path for the first terminal.

8. The terminal according to claim 7, wherein the MAC CE further comprises at least one of the following:

buffer status reporting (BSR) MAC CE;
recommended bit rate MAC CE;
configured grant confirmation MAC CE;
duplication activation/deactivation MAC CE;
cell activation/deactivation MAC CE;
path activation/deactivation MAC CE; or
end-to-end MAC CE between a second terminal and the first communication device.

9. The terminal according to claim 8, wherein in a case that the MAC CE further comprises the BSR MAC CE, the processor is configured to read the computer program in the memory and perform the following operations:

determining a mapping relationship between a logical channel group (LCG) identifier and a logical channel corresponding to an end-to-end bearer between the first terminal and the first communication device;

wherein the mapping relationship is a mapping relationship between the LCG identifier and the logical channel configured by the first communication device for an end-to-end bearer which is selected, by the first communication device from end-to-end bearers, that performs transmission via the direct path.

10. The terminal according to claim 8, wherein in a case that the MAC CE further comprises the BSR MAC CE, the processor is configured to read the computer program in the memory and perform the following operations:

determining uplink available data of a logical channel corresponding to an end-to-end bearer between the first terminal and the first communication device;

wherein the logical channel is a logical channel that only uses the direct path for data communication;

the uplink available data comprises: packet data convergence protocol (PDCP) data and radio link control (RLC) layer data related to the logical channel.

11. The terminal according to claim 7, wherein power for a direct path corresponding to a target cell is deducted in calculating power headroom (PH) information of the target cell in the PHR MAC CE.

12. The terminal according to claim 11, wherein a power headroom of the first terminal on the target cell is:

$$PH=P_{cmax,c}-P_{sidelink}-P_{pusch,c}$$

wherein PH denotes the power headroom of the first terminal on the target cell; $P_{cmax,c}$ denotes a maximum transmitting power of the first terminal that is allowed to be configurable on the target cell; $P_{sidelink}$ denotes a transmitting power of the first terminal on the direct path of the target cell; $P_{pusch,c}$ denotes a power of the first terminal for transmitting a physical uplink shared channel (PUSCH) on an indirect path of the target cell.

13. A non-transitory computer-readable storage medium, having a computer program stored thereon, wherein the computer program, when executed by a processor, implements:

performing, by a first terminal, a media access control control element (MAC CE) transmission and/or reception only on a direct path if the first terminal is configured with both the direct path and an indirect path by a first communication device or the direct path and the indirect path are both activated by the first communication device;

wherein the first communication device is a network-side device accessed by the first terminal, or a peer terminal communicating with the first terminal;

wherein the MAC CE comprises power headroom reporting (PHR) MAC CE, and the computer program, when executed by the processor, further implements:

determining a PHR trigger condition;

wherein the PHR trigger condition comprises: the first communication device configures or activates a new communication path for the first terminal.

14. The non-transitory computer-readable storage medium according to claim 13, wherein the MAC CE further comprises at least one of the following:

buffer status reporting (BSR) MAC CE;
recommended bit rate MAC CE;
configured grant confirmation MAC CE;
duplication activation/deactivation MAC CE;
cell activation/deactivation MAC CE;
path activation/deactivation MAC CE; or
end-to-end MAC CE between a second terminal and the first communication device.

15. The non-transitory computer-readable storage medium according to claim 14, wherein in a case that the MAC CE further comprises is the BSR MAC CE, the computer program, when executed by the processor, further implements:

determining a mapping relationship between a logical channel group (LCG) identifier and a logical channel corresponding to an end-to-end bearer between the first terminal and the first communication device;

wherein the mapping relationship is a mapping relationship between the LCG identifier and the logical channel configured by the first communication device for an end-to-end bearer which is selected, by the first communication device from end-to-end bearers, that performs transmission via the direct path.

16. The non-transitory computer-readable storage medium according to claim 14, wherein in a case that the MAC CE further comprises the BSR MAC CE, the computer program, when executed by the processor, further implements:

determining uplink available data of a logical channel corresponding to an end-to-end bearer between the first terminal and the first communication device;

wherein the logical channel is a logical channel that only uses the direct path for data communication;

the uplink available data comprises: packet data convergence protocol (PDCP) data and radio link control (RLC) layer data related to the logical channel.

17. The non-transitory computer-readable storage medium according to claim 13, wherein, power for a direct path corresponding to a target cell is deducted in calculating power headroom (PH) information of the target cell in the PHR MAC CE.

* * * * *